United States Patent
Tico et al.

(10) Patent No.: US 10,904,658 B2
(45) Date of Patent: Jan. 26, 2021

(54) ELECTRONIC DEVICE DIRECTIONAL AUDIO-VIDEO CAPTURE

(71) Applicant: Nokia Technologies Oy, Espoo (FI)

(72) Inventors: Marius Tico, Mountain View, CA (US); Matti S. Hamalainen, Lempaala (FI); Koray Ozcan, Farnborough (GB); Markku K. Vehvilainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/606,296

(22) Filed: May 26, 2017

(65) Prior Publication Data

US 2017/0265012 A1    Sep. 14, 2017

Related U.S. Application Data

(60) Division of application No. 13/056,709, filed as application No. PCT/US2008/013212 on Nov. 26, (Continued)

(51) Int. Cl.
*H04R 3/00* (2006.01)
*H04N 7/14* (2006.01)
(Continued)

(52) U.S. Cl.
CPC ............... *H04R 3/005* (2013.01); *G06T 7/73* (2017.01); *H04M 1/6008* (2013.01);
(Continued)

(58) Field of Classification Search
CPC ........ H04N 5/4401; H04N 7/147; H04N 7/15; H04R 29/005; G01S 3/7864
See application file for complete search history.

(56) References Cited

U.S. PATENT DOCUMENTS

| | | | |
|---|---|---|---|
| 5,335,011 A | 8/1994 | Addeo et al. | 348/15 |
| 5,686,957 A | 11/1997 | Baker | 348/36 |

(Continued)

FOREIGN PATENT DOCUMENTS

| | | |
|---|---|---|
| CN | 1460185 A | 12/2003 |
| JP | 2006-222618 | 8/2006 |

OTHER PUBLICATIONS

R.L. Hsu, et al., "Face Detection in Color Images", IEEE Transactions on Pattern Analysis and Machine Intelligence, 24:696-706, 2002.

(Continued)

*Primary Examiner* — Lin Ye
*Assistant Examiner* — Chriss S Yoder, III
(74) *Attorney, Agent, or Firm* — Harrington & Smith

(57) ABSTRACT

Disclosed herein is an apparatus. The apparatus includes a housing, electronic circuitry, and an audio-visual source tracking system. The electronic circuitry is in the housing. The audio-visual source tracking system includes a first video camera and an array of microphones. The first video camera and the array of microphones are attached to the housing. The audio-visual source tracking system is configured to receive video information from the first video camera. The audio-visual source tracking system is configured to capture audio information from the array of microphones at least partially in response to the video information. The audio-visual source tracking system might include a second video camera that is attached to the housing, wherein the first and second video cameras together estimate the beam orientation of the array of microphones.

21 Claims, 12 Drawing Sheets

Related U.S. Application Data 2008, now Pat. No. 9,668,077, which is a continuation-in-part of application No. 12/221,395, filed on Jul. 31, 2008, now Pat. No. 9,445,193.

(51) Int. Cl.
*G06T 7/73* (2017.01)
*H04S 7/00* (2006.01)
*H04M 1/60* (2006.01)

(52) U.S. Cl.
CPC ............ *H04N 7/147* (2013.01); *H04S 7/303* (2013.01); *G06T 2207/10024* (2013.01); *G06T 2207/30201* (2013.01); *H04M 1/6041* (2013.01); *H04M 2250/52* (2013.01); *H04N 2007/145* (2013.01); *H04R 2201/401* (2013.01)

(56) References Cited

U.S. PATENT DOCUMENTS

| | | | | |
|---|---|---|---|---|
| 5,940,118 | A * | 8/1999 | Van Schyndel | H04N 7/142 348/14.05 |
| 6,005,610 | A | 12/1999 | Pingali | 348/169 |
| 6,593,956 | B1 | 7/2003 | Potts et al. | 348/14.09 |
| 6,618,485 | B1 | 9/2003 | Matsuo | 381/92 |
| 6,757,397 | B1 | 6/2004 | Buecher et al. | 381/122 |
| 6,826,284 | B1 | 11/2004 | Benesty et al. | 381/92 |
| 7,313,243 | B2 | 12/2007 | Hsu | 381/92 |
| 7,518,631 | B2 | 4/2009 | Hershey et al. | 348/14.1 |
| 7,560,679 | B1 | 7/2009 | Gutierrez | 250/208.1 |
| 8,059,840 | B2 | 11/2011 | Chen | 341/155 |
| 8,165,416 | B2 * | 4/2012 | Cutler | G06K 9/00362 348/207.11 |
| 2002/0018136 | A1 * | 2/2002 | Kaji | H04N 5/232 348/333.02 |
| 2004/0041902 | A1 | 3/2004 | Washington | 348/14.01 |
| 2005/0221867 | A1 | 10/2005 | Zurek et al. | 455/569.1 |
| 2005/0270410 | A1 | 12/2005 | Takayama | 348/345 |
| 2006/0133623 | A1 | 6/2006 | Amir et al. | 381/92 |
| 2007/0016426 | A1 | 1/2007 | Hershey et al. | 704/277 |
| 2008/0100719 | A1 * | 5/2008 | Huang | H04M 1/0264 348/211.99 |

OTHER PUBLICATIONS

M.H. Yang et al., "Detecting Faces in Images: A Survey", IEEE Transactions on Pattern Analysis and Machine Intelligence, 24:34-58; 2002.
A. Hadid et al., "A Hybrid Approach to Face Detection Under Unconstrained Environments", International Conference of Pattern Recognition, (ICPR 2006).
U. Bub et al., "Knowing Who to Listen to in Speech Recognition: Visually Guided Beamforming", Interactive System Laboratories (May 1995).
M. Collobert et al., "Listen: A System for Locating and Tracking Individual Speakers", France Telecom, IEEE Transaction (1999).
N. Strobel et al., "Joint Audio-Video Object Localization and Tracking" IEEE Signal Processing Magazine (2001).

* cited by examiner

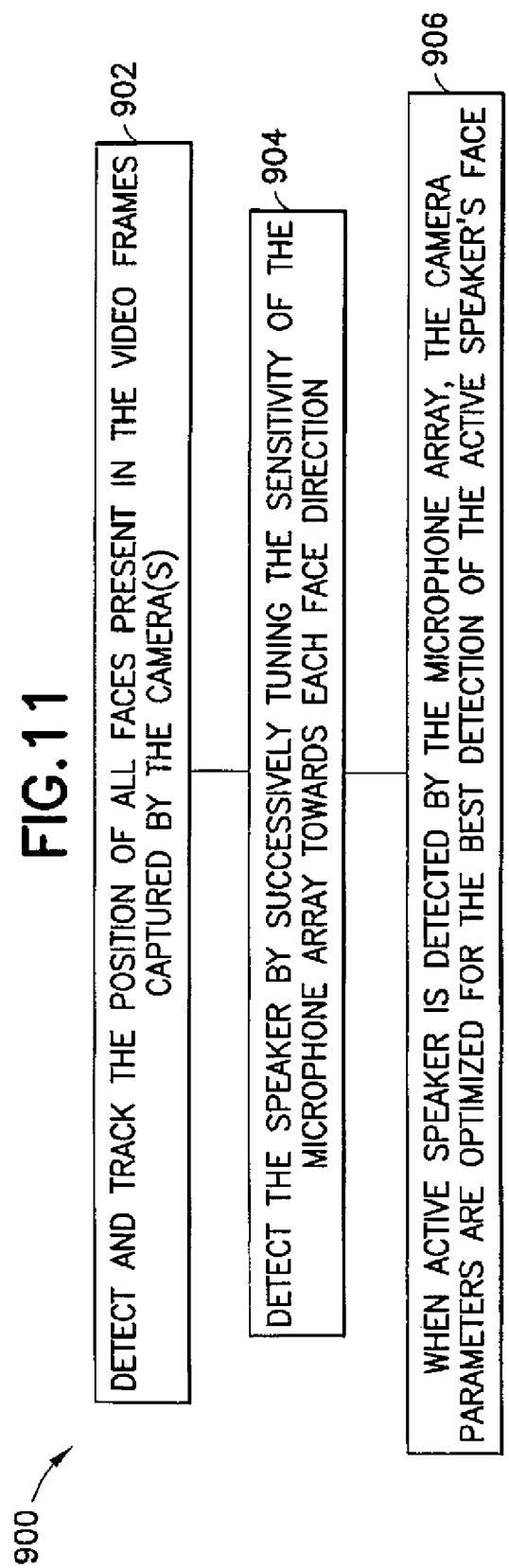
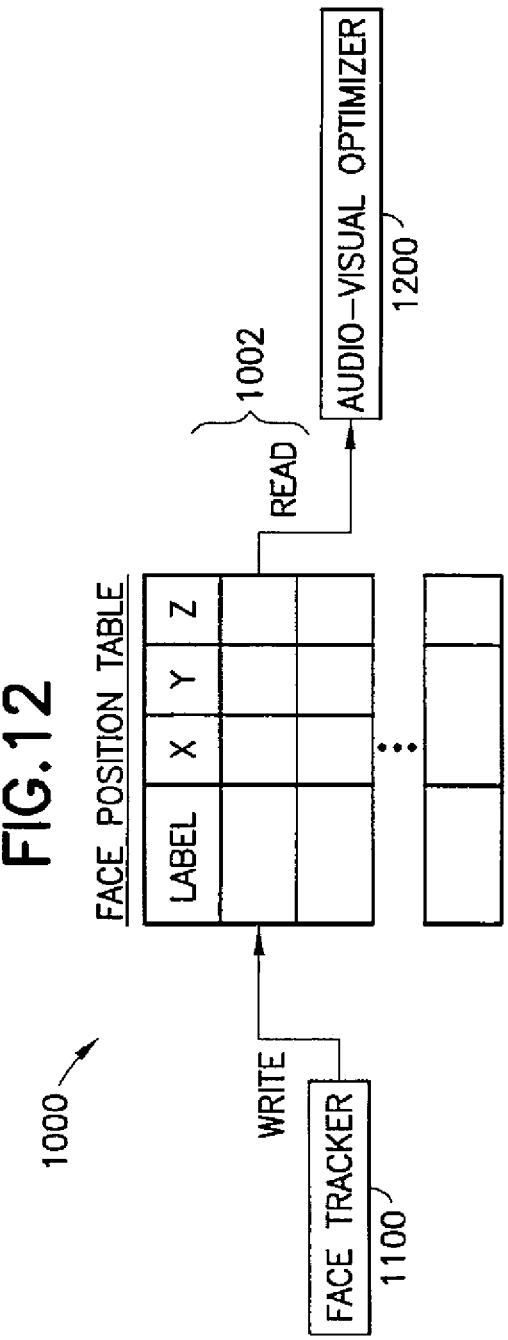

ELECTRONIC DEVICE DIRECTIONAL AUDIO-VIDEO CAPTURE

CROSS REFERENCE TO RELATED APPLICATION

This is a divisional patent application of U.S. patent application Ser. No. 13/056,709 filed Mar. 4, 2011, which is a national stage application of PCT Application No. PCT/US08/13212 filed Nov. 26, 2008, which is a continuation-in-part patent application of U.S. patent application Ser. No. 12/221,395 filed Jul. 31, 2008, which are all hereby incorporated by reference in their entireties.

BACKGROUND

Field of the Invention

The invention relates to an electronic device and, more particularly, to directional audio-video capture for an electronic device.

Brief Description of Prior Developments

Electronic devices having speaker phone or hands free applications are known in the art. During a hands free voice call, any sounds other than the user's voice may be considered as background noise which should be attenuated (or eliminated) in order to improve the quality of the phone conversation. The noise can be related to environment, network, and audio chains corresponding to sending and receiving signals. The environmental noise (or interfering sounds/background noise) can easily interfere during the hands free voice call and sometimes can exceed the user's voice (signal) level such that it becomes very difficult to separate the two. This may cause a poor signal to noise ratio (SNR).

There are several audio-only source tracking techniques for speech communication known in the art. With conventional configurations providing for sending an audio use directivity pattern that can attenuate the sensitivity to outside of the source (user) direction, it is possible to improve the SNR and eliminate the unwanted signals from the source signals before the signal is transmitted. However, this assumes that the direction-of-arrival (DOA) of the signal is known or can be estimated. Additionally, audio based tracking using the conventional techniques generally does not work for a silent moving source.

In the case of hand-held mobile communication devices the relative position of the sound sources can also move due to the movement of the device. Continuous handling of the device (e.g. due to spontaneous gestures and hand movements) makes the source tracking task much more challenging compared to a traditional meeting room setup where the device can be assumed to be relatively stationary compared to the movement of the sound source. Device movements can introduce very fast changes in the DOA that would be unlikely by the movement of the sound source.

In a typical mobile communication voice call, the relative position of the user and the device can change. Since the audio-only tracking systems require audio data for the calculation of DOA angle(s), this introduces a processing delay for the tracking information (thus preventing real-time source location information updates). Unfortunately in real-time voice communication the end-to-end delay needs to be minimized for fluent operation. This can lead into several problems. For example, when the user moves during speech pauses, the source tracker may lose the correct source position during the silent periods. When the speaker starts to talk, the beginning of the sentence could be distorted due to incorrect location information. From the multi-microphone noise reduction point of view this means that the user's voice is processed as a background noise source until the correct location information is taken into account.

Another class of directional audio capture algorithms form the directivity pattern of the microphone array by utilizing the statistical properties of the signal. These algorithms do not utilize dedicated sound source location information but try to self-adapt to the desired source. Typically these algorithms need to adapt to the changes both in the source location but also in the room impulse response. This makes these algorithms relatively slow in reacting to instantaneous changes in the environment. It is also non-trivial to control an algorithm that is making autonomous decisions about the source direction without a possibility for an external control. For example in the case of loud interfering source (a.k.a jammer), it becomes more difficult to control the microphone array to classify the source as a noise source, especially if the signal statistics of the interfering source are similar to the desired source, e.g. in the case of competing talker.

Additionally, human face detection and video tracking of human faces are known in the art. Face detection deals with the localization of a face (or multiple faces) in an input image. The process includes scanning the entire image, if no prior knowledge about the face position is available. Face tracking may also extend to face detection by using temporal correlation to locate a human face in a video sequence. Rather than detecting the face separately in each frame, knowledge about the face position in the previous frame is used in order to narrow the search in the current frame.

For example, "Face Detection In Color Images" (R. L. Hsu, M. Abdel-Mottaleb, and A. K. Jain, IEEE Transactions on Pattern Analysis and Machine Intelligence, 24:696-706, 2002), which is hereby incorporated by reference in its entirety, describes one approach to face detection based on skin color detection. Approaches for face detection (or tracking) based on skin color detection generally determine and group the skin color pixels which are found in the image. Next, for each such group of pixels, a bounding box (or the best fitting ellipse) is computed. The skin components which verify certain shape and size constraints are selected as face candidates. Finally, features (such as eyes and mouth) are searched inside each face candidate based on the observation that holes inside the face candidate are due to these features being different from the skin color.

Further, "Detecting Faces In Images: A Survey" (M. Yang, D. J. Kriegman, and N. Ahuja, IEEE Transactions on Pattern Analysis and Machine Intelligence, 24:34-58, 2002), which is hereby incorporated by reference in its entirety, describes one approach to face detection based on face texture information.

Moreover, "A Hybrid Approach To Face Detection Under Unconstrained Environments" (A. Hadid, M. Pietikainen, International Conference of Pattern Recognition (ICPR 2006)), which is hereby incorporated by reference in its entirety, describes one approach to face detection based on color and texture information.

U.S. Pat. No. 6,826,284, which is hereby incorporated by reference in its entirety, discloses a system where source tracking information enables device control, such as camera steering, for example.

In addition, "Knowing Who To Listen To In Speech Recognition: Visually Guided Beamforming" (U. Bub, M.

Hunke, and A. Waibel, Interactive System Laboratories, IEEE 1995) and "Listen: A System For Locating And Tracking Individual Speakers" (M. Collobert, R. Ferraud, G. Le Tourneur, O. Bernier, J. E. Viallet, Y. Mahieux, D. Collobert, France Telecom, IEEE Transactions (1999)), which are hereby incorporated by reference in their entireties, disclose using a mechanical device to move a camera towards a user's face for visual and audio tracking used in fixed teleconferencing conditions.

"Joint Audio-Video Object Localization and Tracking" (N. Strobel, S. Spars and R. Rabenstein, IEEE Signal Processing Magazine (2001)), discloses an object tracking methodology.

Further, U.S. Pat. No. 5,335,011 discloses using a sound localization technique which is based on the prior knowledge of the position of each user.

However, despite the above advances, there is still a strong need to provide an improved audio capture system.

SUMMARY

In accordance with one aspect of the invention, an apparatus is disclosed. The apparatus includes a housing, electronic circuitry, and an audio-visual source tracking system. The electronic circuitry is in the housing. The audio-visual source tracking system includes a first video camera and an array of microphones. The first video camera and the array of microphones are attached to the housing. The audio-visual source tracking system is configured to receive video information from the first video camera. The audio-visual source tracking system is configured to capture audio information from the array of microphones at least partially in response, to the video information.

In accordance with another aspect of the invention, a method is disclosed. A housing is provided. Electronic circuitry is installed in the housing. A tracking system is provided proximate the housing. Therein the tracking system includes a first video camera and a microphone. The first video camera is attached to the housing. The microphone is proximate the first video camera. The tracking system is configured to receive a video signal from the first video camera. The tracking system is configured to capture an audio signal from the microphone at least partially in response to the video signal.

In accordance with another aspect of the invention, a method is disclosed. A first image is captured with a camera of an apparatus. A direction of a portion of the first image with respect to a microphone array of the apparatus is determined. A predetermined characteristic of the microphone array is controlled based at least partially on the direction of the portion of the first image.

In accordance with another aspect of the invention, a program storage device readable by a machine, tangibly embodying a program of instructions executable by the machine for performing operations to sense an audio signal is disclosed. A portion of an image is analyzed. A direction corresponding to the portion of the image is calculated. The direction is relative to an apparatus. A microphone array is directed from the apparatus based at least partially upon the calculated direction.

In accordance with another aspect of the invention, an apparatus is disclosed. The apparatus includes a housing, electronic circuitry, and an audio-visual optimizing system. The electronic circuitry is in the housing. The audio-visual optimizing system includes a first video camera and an array of microphones. The first video camera and the array of microphones are attached to the housing. The first video camera includes at least one adjustable parameter. The audio-visual optimizing system is configured to receive audio information from the array of microphones. The audio-visual optimizing system is configured to adjust the at least one adjustable parameter of the first video camera in response to, at least partially, the audio information.

In accordance with another aspect of the invention, a method is disclosed. An image is captured with a camera of an apparatus. A first position of a portion of the image is determined. Audio information corresponding to the first position is captured. A parameter of the camera is controlled in response to, at least partially, the captured audio information.

In accordance with another aspect of the invention, a program storage device readable by a machine, tangibly embodying a program of instructions executable by the machine for performing operations to capture audio-visual information is disclosed. A microphone array of a device is tuned. Audio information received by the microphone array is evaluated. A camera parameter of the device is adjusted based on, at least partially, the evaluated audio information.

BRIEF DESCRIPTION OF THE DRAWINGS

The foregoing aspects and other features of the invention are explained in the following description, taken in connection with the accompanying drawings, wherein:

FIG. 11 is a block diagram of an exemplary method of the electronic device shown in FIG. 1 and FIG. 6;

FIG. 12 is a block diagram of an exemplary Face position Table used in the electronic device shown in FIG. 1 and FIG. 6;

DETAILED DESCRIPTION

Figure 1:
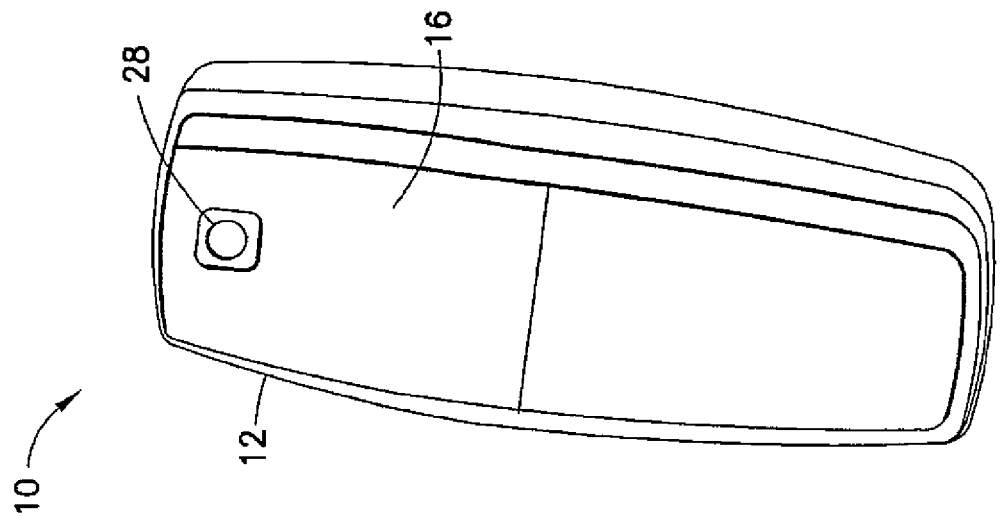
FIG. 1 is a perspective view of a front face of an electronic device incorporating features of the invention.

Referring to FIG. 1, there is shown a perspective view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
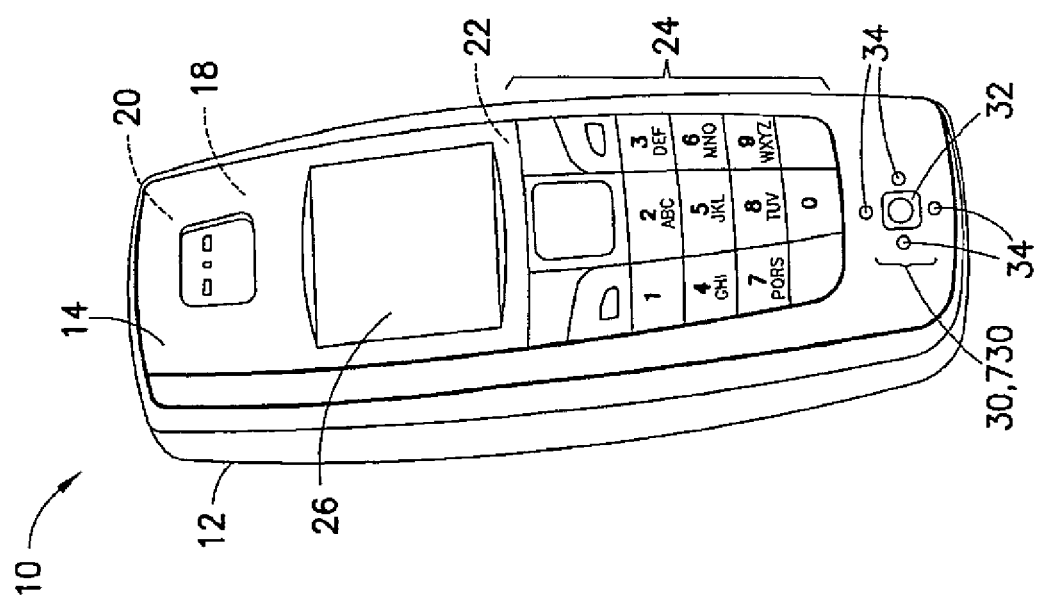
FIG. 2 is a perspective view of a back face of the electronic device shown in FIG. 1.

According to one example of the invention shown in FIGS. 1 and 2, the device 10 is a multi-function portable electronic device. However, in alternate embodiments, features of the exemplary embodiment of this invention could be used in any suitable type of hand-held portable electronic device such as a mobile phone, a gaming device, a music player, or a PDA, for example. In addition, as is known in the art, the device 10 can include multiple features or applications such as a camera, a music player, a game player, or an Internet browser, for example.

Referring also to FIG. 2, the device 10 generally comprises a housing 12 having a front face 14 and a back face 16, a transceiver 18 connected to an antenna 20, electronic circuitry 22, such as a controller and a memory for example, within the housing 12, a user input region 24 and a display 26. The display 26 could also form a user input section, such as a touch screen. It should be noted that in alternate embodiments, the device 10 can have any suitable type of features as known in the art.

The electronic device 10 further comprises a primary camera 28, and an audio-visual source tracking system 30. The primary camera 28 is mounted within the housing 12 proximate the back face 16 of the device 10. The camera 28 could comprise a still image digital camera and/or a video camera, or any other suitable type of image taking device.

The audio-visual source tracking system 30 comprises a secondary camera 32, and an array of microphones 34.

The secondary camera 32 is mounted within the housing 12 proximate the front face 14 of the device 10. The camera 32 may comprise a video camera for example. The video camera may be oriented and configured to capture an image of a face of a user of the device. The video camera may be used for video capture when performing video calling with the device. However, any suitable type of image taking device may be provided. For example, in alternate embodiments, the video camera may also be a web cam mounted to a computer for video calling.

It should further be noted that the camera may, according to one embodiment of the invention, be a camera used for video calls in a mobile phone where dual cameras have been integrated one facing the rear and another facing the user which is dedicated for video hands free calls.

The array of microphones 34 are mounted within the housing 12 proximate the secondary camera 32. The array of microphones 34 may surround the camera 32 (in close proximity). However, in alternate embodiments, any suitable location or orientation for the microphones 34 may be provided. The array of microphones 34 are configured to capture a voice of a user of the device. The microphones 34 may be configured for microphone array beam steering in two dimensions (2D) or in three dimensions (3D). In the example shown in FIG. 1, the array of microphones 34 comprises four microphones. However, in alternate embodiments, more or less microphones may be provided. For example, in one embodiment, the array of microphones 34 may comprise three microphones.

The relative positions and orientations of the camera 32 and microphone array 34 may be either be known (fixed) in advance, or estimated based on time averaged of visual and acoustic source tracking information. However, it should be noted that the relative positions and orientations of the camera and microphone array may be provided with any other suitable location means known in the art. Either the microphone array or the camera, or both, may provide information about the source distance.

It should be noted that although the figures illustrate the primary camera 28 at the back face 16 of the electronic device 10 and the audio-visual source tracking system 30 at the front face 14 of the device, alternate embodiments may comprise the camera 28 and the audio-visual source tracking system 30 at any suitable location. For example, the primary camera 28 may be provided at the front face 14 of the electronic device 10 and the audio-visual source tracking system may be provided at the back face 16 of the device 10. In another example, the primary camera 28 and the audio-visual source tracking system 30 may both be provided at the front face 14 or the back face 16 of the electronic device 10. Additionally, one or both of the camera 28 and the audio-visual source tracking system 30 may be provided at a lateral side face of the housing 12. The camera information may also be utilized to track the movement of the device. It should further be understood that more than two cameras or a single camera (wherein the single camera functions as the primary camera and the secondary camera) may be provided.

According to various exemplary embodiments of the invention, the audio-visual source tracking system 30 provides face tracking assisted directional audio capture for telephone and video telephone conversations. The audio-visual source tracking system 30 improves the uplink audio performance (or audio quality) of hands free voice/video calls in noisy environments which is noticeable by the end user during a mobile speech call.

The audio-visual source tracking system 30 may provide for video tracking of human faces and the controlling of the directional sensitivity of the microphone array for directional audio capture to improve the quality of voice and/or video calls in noisy environments. Examples of the invention may include advanced techniques for robust and efficient face detection and tracking. Such techniques and algorithms have been developed by several research groups and they are currently in use in several applications (e.g. face recognition, face tracking, etc). Face tracking algorithms can achieve high performance and may be run in real time even relatively lower computational power machines, such as mobile phones, for example.

The audio-visual source tracking system 30 is configured to use the video information corresponding to the user's face position in order to assist the audio capturing process. This may be performed by determining the mouth reference point of the user speaking into the device and forming the beam of the microphone array towards the user's mouth (or reference point).

The audio-visual source tracking system 30 detects and tracks the user's face in the video frames captured by the secondary camera (as the secondary camera is oriented towards the user of the device). The fixed positions of the camera and microphones within the device allows for a known orientation of the camera relative to the orientation of the microphone array (or beam orientation). It should be noted that references to microphone beam orientation or beam orientation may also refer to a face direction of a user with respect to a microphone array. The audio-visual source tracking system 30 may be configured for selective enhancement of the audio capturing sensitivity along the specific spatial direction towards the user's mouth. For example, the sensitivity of the microphone array 34 may be adjusted towards the direction of the user (such as, when the user is speaking, for example). It is therefore possible to reject unwanted sounds which enhance the quality of audio that is transmitted to the far end user. The unwanted sounds may come from the sides of the device, or any other direction (such as any direction other than the direction towards the user's mouth, for example), and could be considered as background noise which may be cancelled or significantly reduced.

In enclosed environments where reflections might be evident, as well as the direct sound path, examples of the invention improve the direct sound path by reducing and/or eliminating the reflections from surrounding objects (as the acoustic room reflections of the desired source are not aligned with the DOA of the direct sound path). The attenuation of room reflections can also be beneficial, since reverberation makes speech more difficult to understand. Embodiments of the invention provide for audio enhancement during silent portions of speech partials by tracking the position of the user's face by accordingly directing the beam of the microphone array towards the user.

Various exemplary embodiments of the invention overcome the limitations of conventional pure audio techniques by allowing the separation, reduction, and estimation (at very low SNR levels) of a moving source during the speech pauses by using the additional information about the direction of the desired signal.

Figure 3:
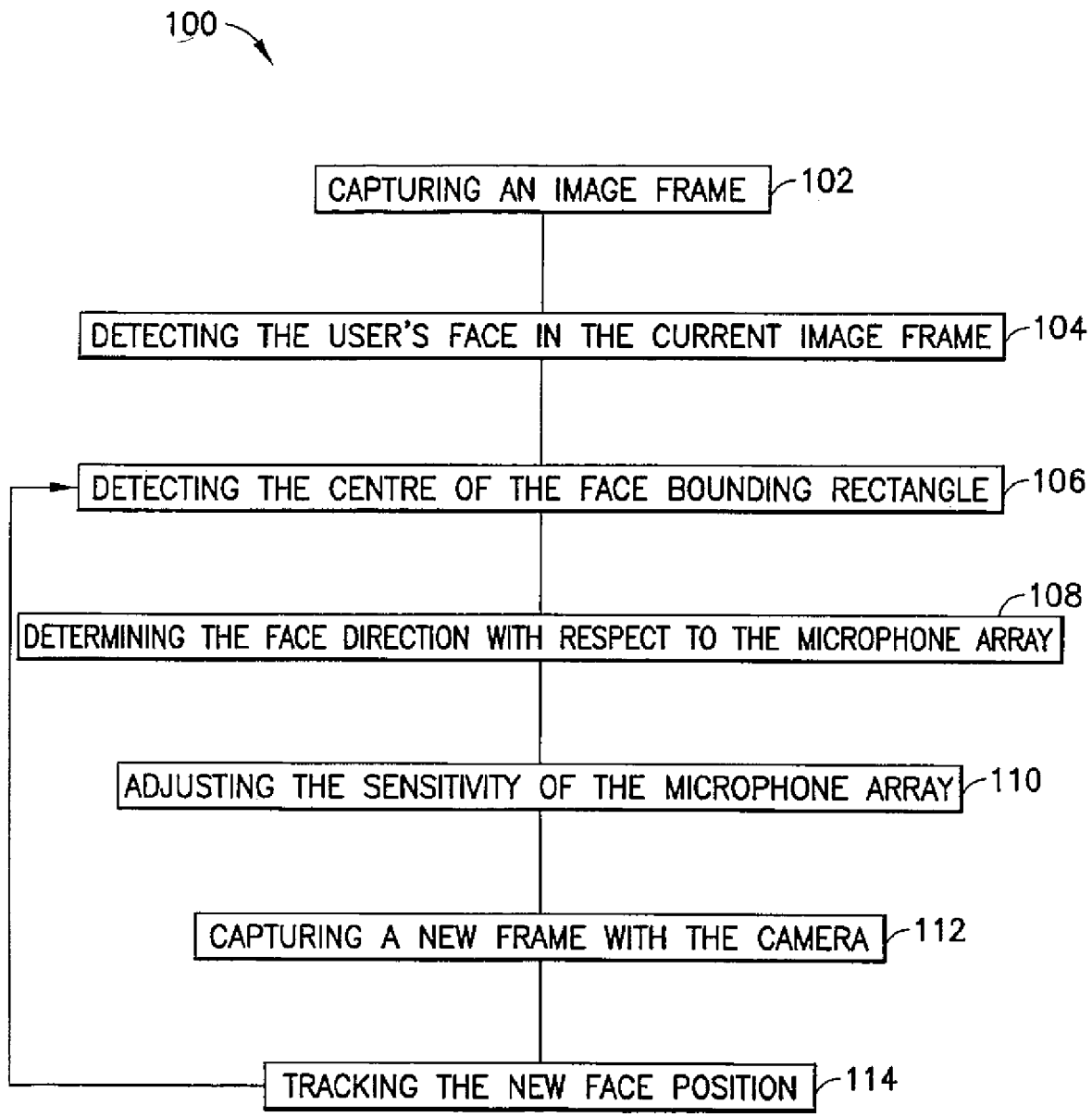
FIG. 3 is a block diagram of an exemplary algorithm used in the electronic device shown in FIG. 1.
Figure 5:
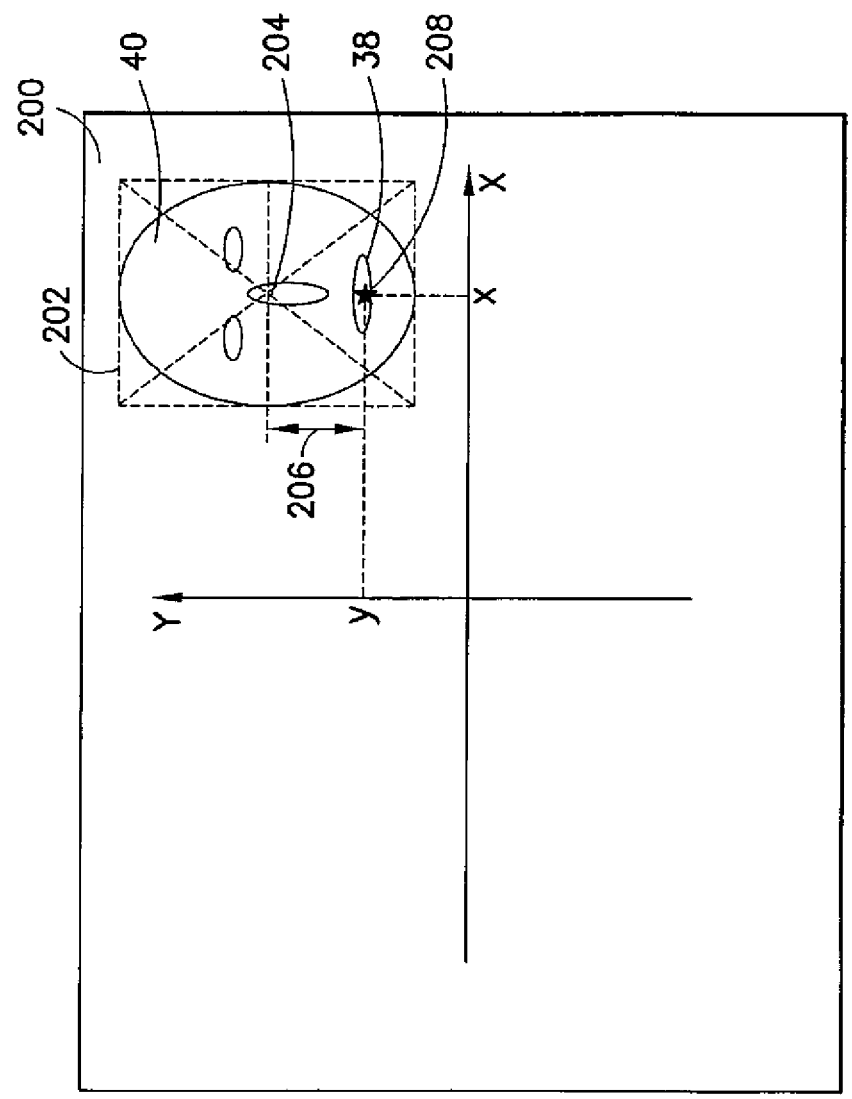
FIG. 5 is a diagram of face detection elements used in the tracking system of the electronic device shown in FIG. 1.

Referring now also to FIG. 3, an exemplary algorithm 100 of the audio-visual source tracking system is illustrated. The algorithm may be provided for implementing the video tracking of the user and controlling the sensitivity of directional microphone beam of a microphone array (for the desired audio signal to be transmitted). The algorithm may include the following steps. Capturing an image frame with the secondary camera (step 102). Detecting the user's face in the current image frame. The face position can be detected using for instance skin colour approach (step 104). Detecting the centre of the face bounding rectangle and calculating the approximate position of the mouth (as shown in FIG. 5). The mouth can be also detected based on the fact that its color does not resemble the skin color (eyes and mouth appear as holes in the skin color group of the pixels) (step 106). Determining the face direction with respect to the microphone array (such as, a 3D direction of the mouth, for example), based on the mouth position in the video frame, and based on knowledge about the camera focal length. If the microphone array is close to the camera than the two angles (along horizontal and vertical directions) that define the 3D direction can be determined as follows:

$\theta_x = a\tan(x/f)$, $\theta_y = a\tan(y/f)$ where f denotes the camera focal length, and x, y is the position of the mouth with respect to the frame image coordinates (see FIGS. 4, 5) (step 108). Increasing the directivity (relative sensitivity) of the microphone array along the direction determined at step 108 (step 110). Capturing a new frame with the secondary camera (step 112). Tracking the new face position in the new frame by searching in the neighborhood of the previous face position in the previous frame (step 114). Return to step 106.

It should be noted that the algorithm may be provided as an infinite loop. However, in alternate embodiments, the algorithm could be a start/stop algorithm by specific user interface (UI) commands, for example. However, any suitable algorithm may be provided.

Figure 4:
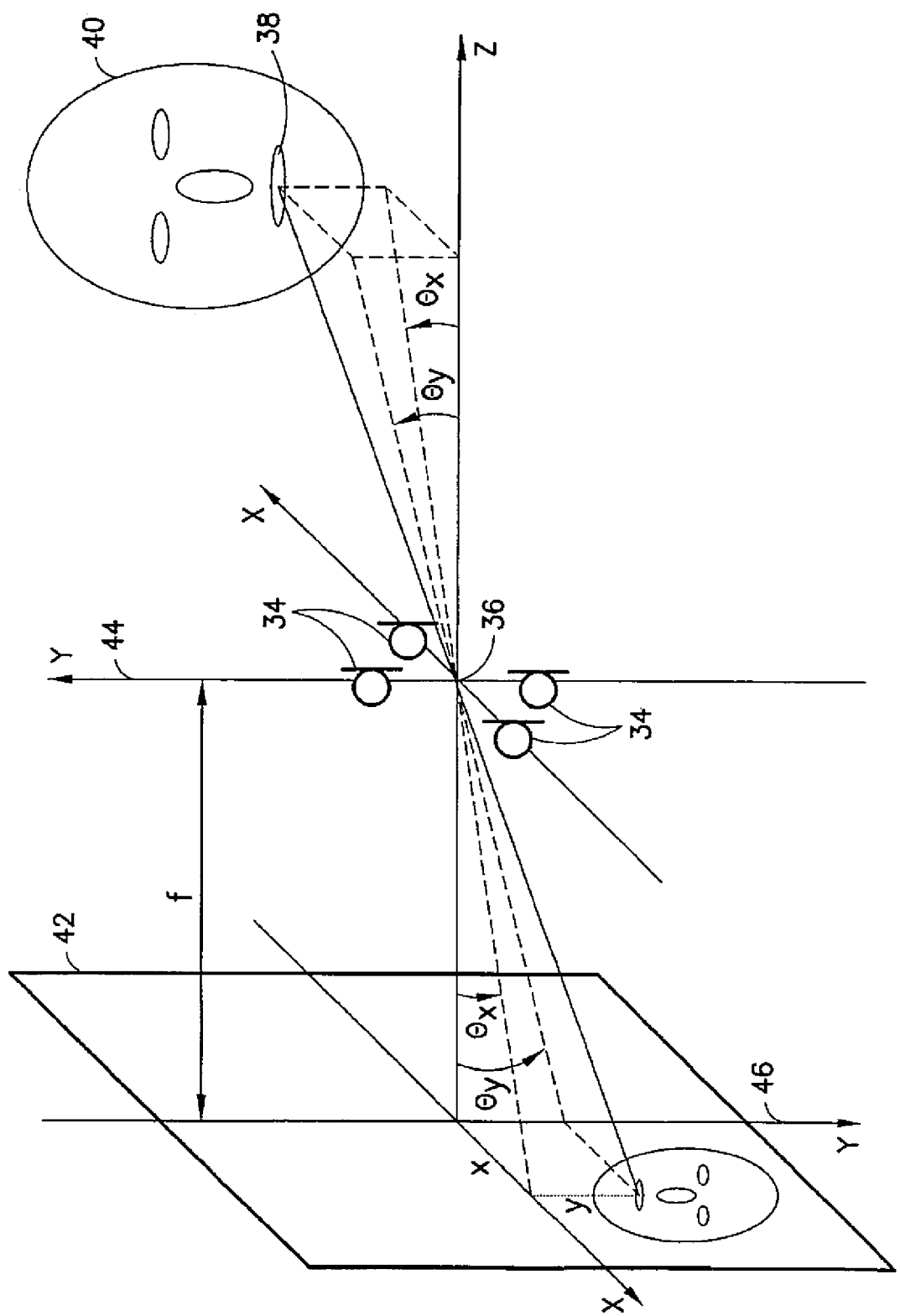
FIG. 4 is a diagram of an a portion of a tracking system used in the electronic device shown in FIG. 1 relative to a user and coordinate systems.

Referring now also to FIG. 4, a diagram illustrating one example of how the direction to the (tracking face/mouth) position (as presented in the algorithm 100 above) may be determined is shown. The direction (relative to the optical centre 36 of the camera 32) of the mouth 38 of the user 40 is defined by two angles $\theta_x$, $\theta_y$. In the embodiment shown the array of microphones 34 closely surround the optical centre 36 of the camera 32. Additionally, the image sensor plane where the image is projected is illustrated at 42, the 3D coordinate system with the origin at the camera optical center is illustrated at 44, and the 2D image coordinate system is illustrated at 46.

Referring now also to FIG. 5, a diagram illustrating various face detection elements (as presented in the algorithm 100 above) are shown. An exemplary image frame captured by the secondary camera is shown at 200. A face of the user 40 detected is shown in the image frame 200. A boundary rectangle of the face area is shown at 202. The center of the boundary rectangle is shown at 204. A displacement below the center where the position of the mouth 38 is assumed is shown at 206. The point of interest that approximates the position of the mouth is shown at 208.

Various exemplary embodiments of the invention provide an improved configuration allowing for a high quality hands free voice and/or video call (even in noisy environments). Additionally, the advantage of speaker tracking during speech pauses (such as sending audio during pauses between speech partials) may also be provided. Further, examples of the invention may utilize the existing camera hardware in mobile devices having two cameras (one facing towards the user). Yet further, embodiments of the invention may be adapted in single camera products providing that microphone arrays are located near camera module.

Figure 6:
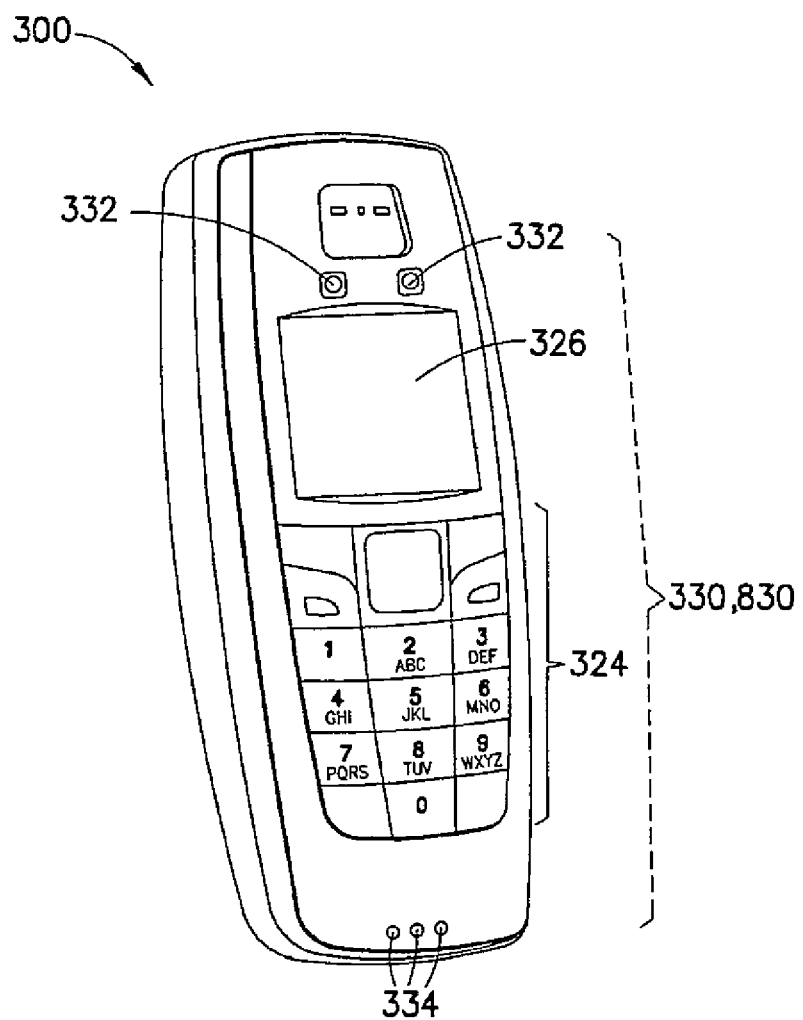
FIG. 6 is perspective view of another electronic device incorporating features of the invention.
Figure 7:
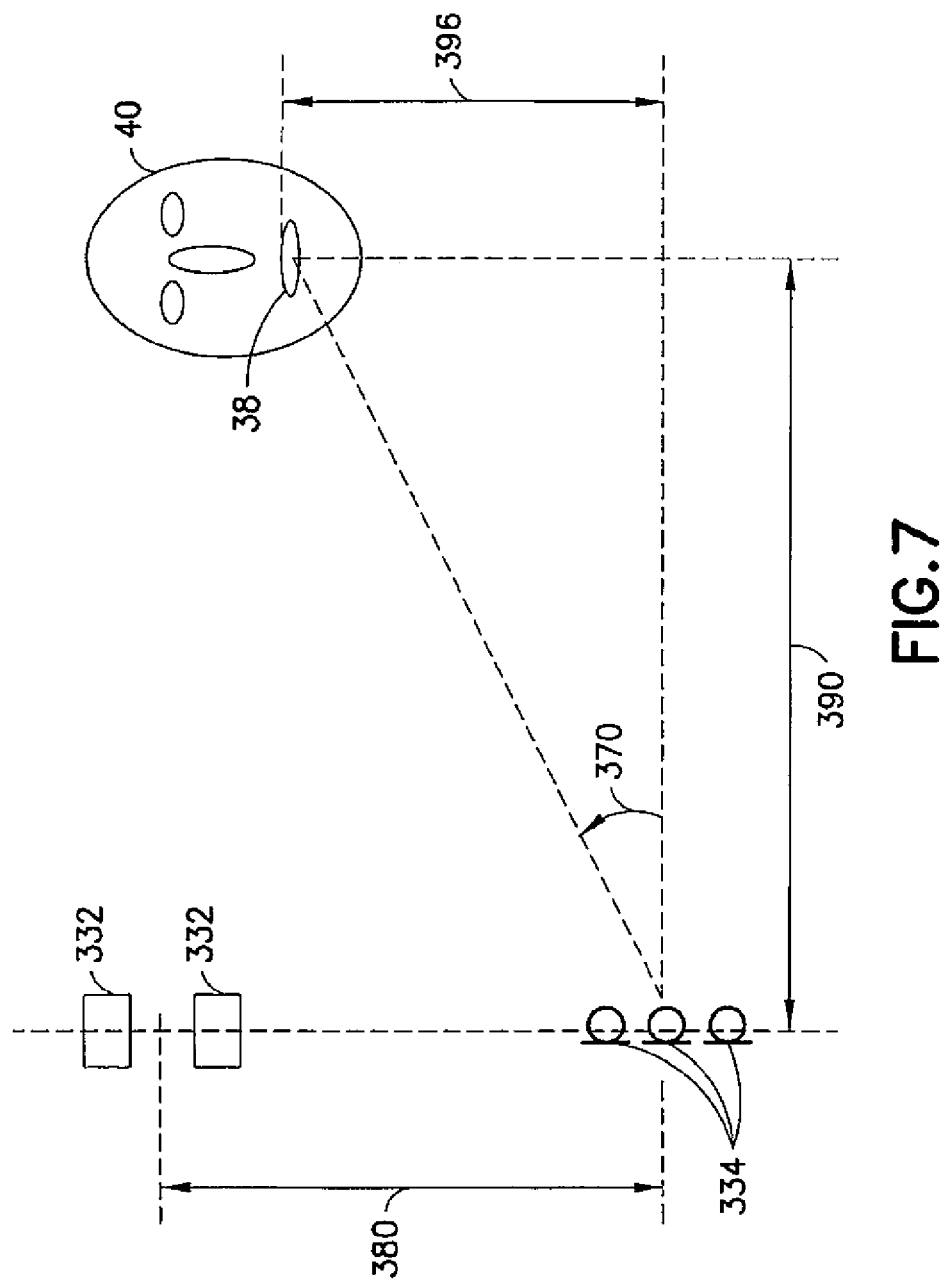
FIG. 7 is a diagram of an a portion of a tracking system used in the electronic device shown in FIG. 6 relative to a user.

Referring now also to FIGS. 6 and 7, an electronic device 300 having an audio-visual source tracking system 330 comprising two cameras 332 and three microphones 334 is illustrated. The audio-visual source tracking system 330 provides for audio quality improvement in uplink audio by using two cameras 332 to estimate the beam orientation 370 relative the mouth 38 of the user 40. If the microphone array 334 is located far away from the camera view angle (effectively camera module itself) as shown in FIG. 6, the distance between the user's 40 face position and center of the microphone array may be difficult to calculate. For example, for a larger distance 380, the depth 390 information may be provided to estimate the beam orientation 370. On the other hand, only one camera may be provided with the configuration of the audio-visual source tracking system 30 of the device 10 as the distance between the camera 32 and the microphones 34 is relatively small. The estimation of the microphone beam direction 370 relevant to the user 40 face may be provided by using two cameras 332 to estimate the depth 390. Embodiments of the invention therefore provide flexibility in mobile phone designs where microphone arrays can be designed by having a better microphone location flexibility. Additionally, it should be noted that an elevation (or azimuth) 396 of the mouth 38 of the user 40 may be estimated with one or more cameras. Distance information may be also obtained with a single 3D camera technology providing depth map for the image.

Figure 8:
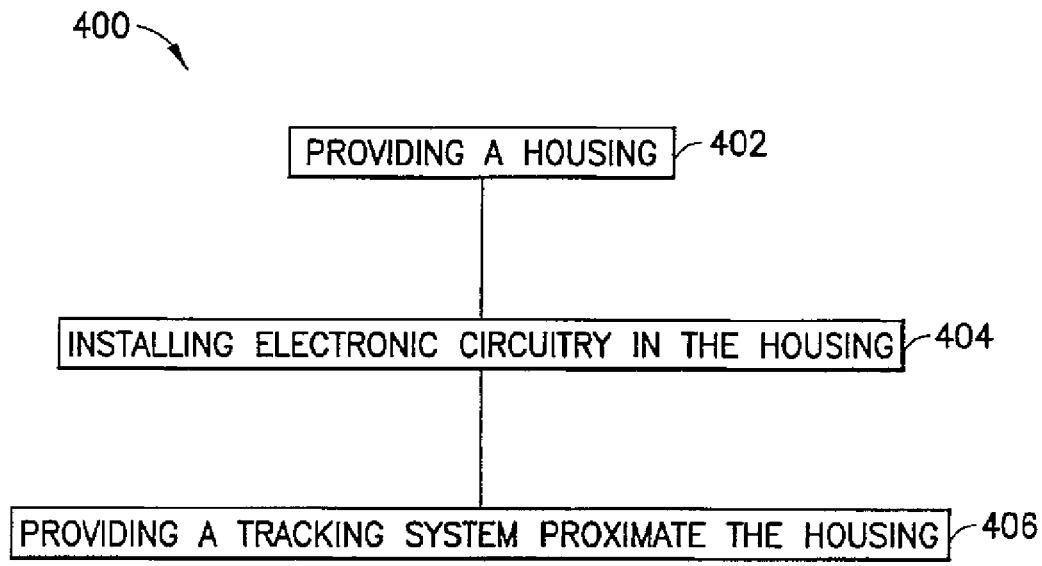
FIG. 8 is a block diagram of an exemplary method of the electronic device shown in FIG. 1 and FIG. 6.

FIG. 8 illustrates a method 400 of manufacturing the electronic device 10, 300. The method includes the following steps. Providing a housing (step 402). Installing electronic circuitry in the housing (step 404). Providing a tracking system proximate the housing, wherein the tracking system comprises a first video camera and a microphone, wherein the first video camera is attached to the housing, wherein the microphone is proximate the first video camera, wherein the tracking system is configured to receive a video signal from the first video camera, and wherein the tracking system is configured to capture an audio signal from the microphone at least partially in response to the video signal (step 406). It should be noted that any of the above steps may be performed alone or in combination with one or more of the steps.

Figure 9:
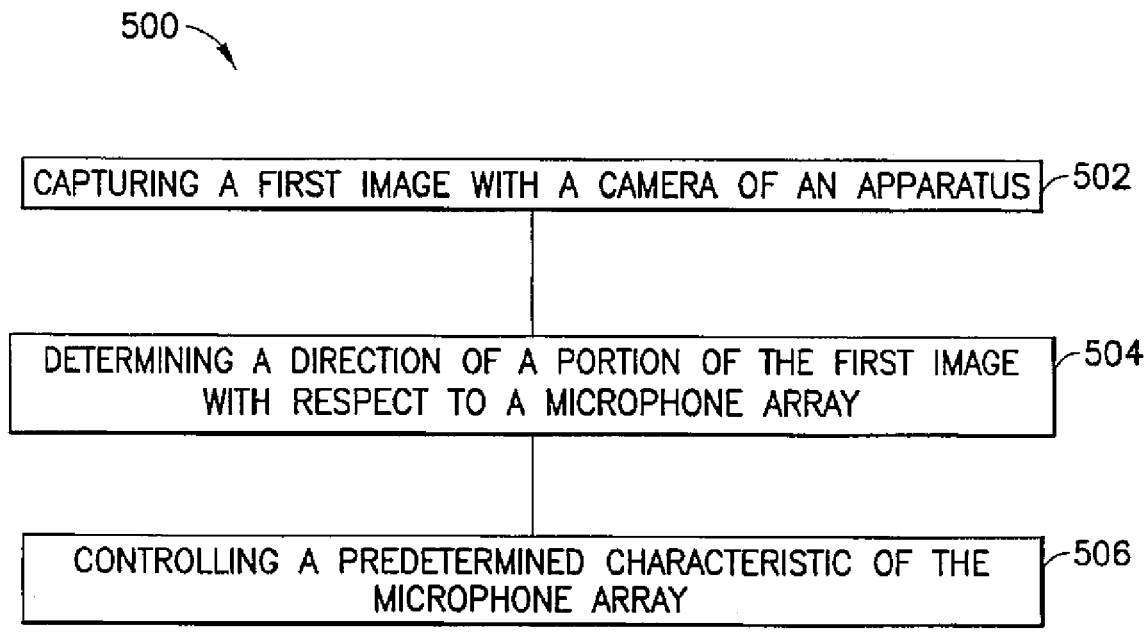
FIG. 9 is a block diagram of another exemplary method of the electronic device shown in FIG. 1 and FIG. 6.

FIG. 9 illustrates a method 500. The method includes the following steps. Capturing a first image with a camera of an apparatus (step 502). Determining a direction of a portion of the first image with respect to a microphone array of the apparatus (step 504). Controlling a predetermined characteristic of a microphone array based at least partially on the direction of the portion of the first image (step 506).

Figure 10:
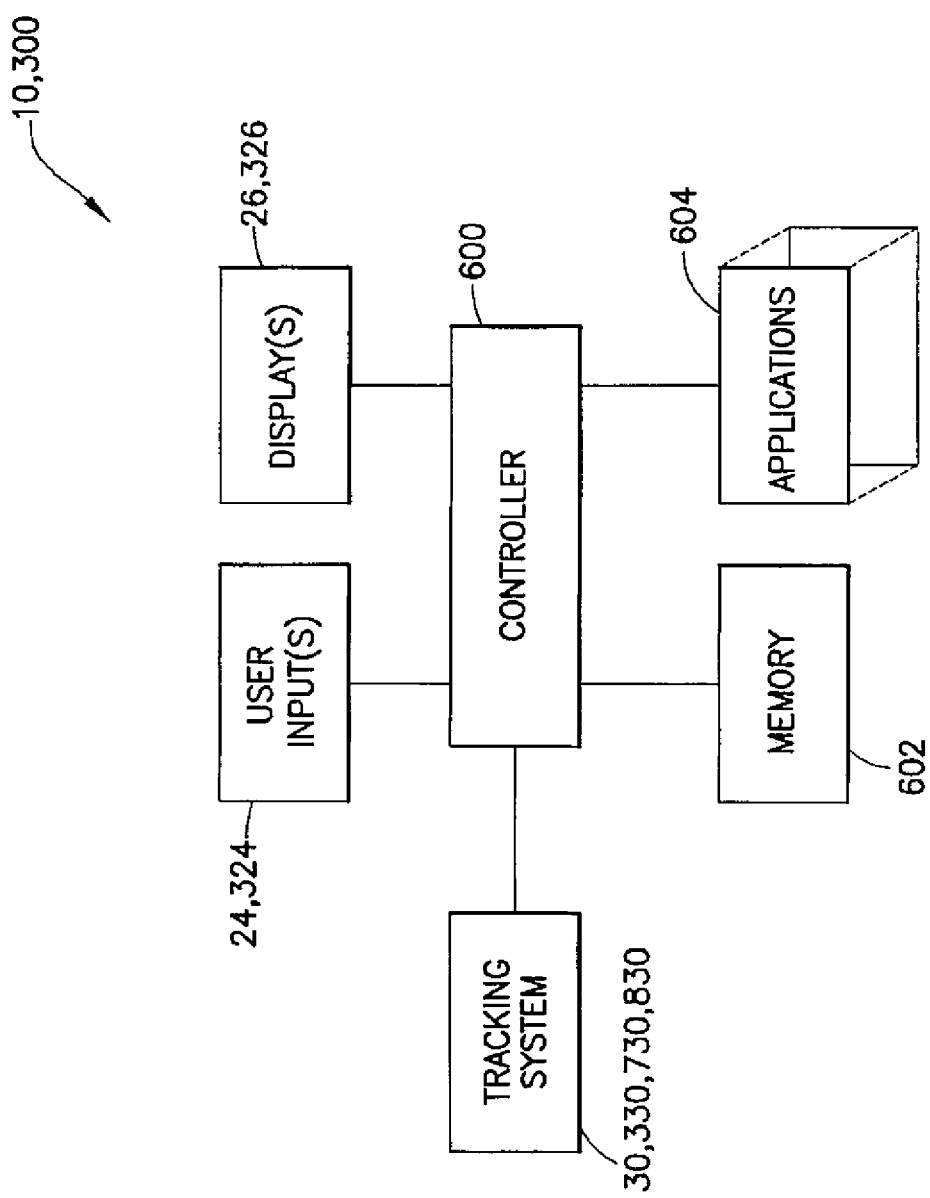
FIG. 10 a schematic drawing illustrating components of the electronic device shown in FIG. 1 and FIG. 6.

Referring now also to FIG. 10, the device 10, 300 generally comprises a controller 600 such as a microprocessor for example. The electronic circuitry includes a memory 602 coupled to the controller 600, such as on a printed circuit board for example. The memory could include multiple memories including removable memory modules for example. The device has applications 604, such as software, which the user can use. The applications can include, for example, a telephone application, an Internet browsing application, a game playing application, a digital camera application, etc. These are only some examples and should not be considered as limiting. One or more user inputs 24, 324 are coupled to the controller 600 and one or more displays 26, 326 are coupled to the controller 600. The audio-visual tracking system 30, 330 is also coupled to the controller 600. The device 10, 300 may programmed to automatically change capture or sense an audio signal. However, in an alternate embodiment, this might not be automatic. The user might need to actively select a change in the tracking system 30, 330.

Various exemplary embodiments of the invention provide advantages over audio only conventional configurations. In two way communication systems, a challenge occurs because the relative position of user (and accordingly the mouth reference point) and/or the position of the handset can change. The audio-only tracking systems require audio data for the calculation of the direction of arrival (DOA), and therefore a processing delay is introduced for the tracking information. In real-time voice communications, it is desirable for the end-to-end delay to be minimized for fluent operation. For instance, when user moves during silent portions of speech, the source tracker will lose the mouth reference point. The incorrect mouth reference point (that accordingly means incorrect directionality of the microphone beam) can easily cause distortions at the beginning of the initial speech partials. This is where an audio-visual source tracking system can be beneficial because it can update the source location information in real time. Microphone(s) having spatial directivity improve the capture of audio signals by emphasizing sounds that are coming from the direction of the desired source by attenuating the sensitivity to other directions. With audio-visual source tracing it is possible to steer the maximum sensitivity of the microphone array towards the desired source (generally the user's face (or mouth)).

Still referring to FIG. 10, the device 10 may comprise an audio-visual source tracking system 730 according to another example of the invention. Similar to the tracking system 30, the tracking system (or audio-visual optimizing system) 730 (also shown in FIG. 1) comprises the secondary camera 32 and the array of microphones 34. Similarly, the system 730 is configured to optimize the audio capture of the device 10 by tuning the audio sensitivity towards the direction of the human face. As described above, the audio sensitivity may be maximized towards the desired spatial direction by tuning the sensitivity beam of the microphone array 34. However, the system 730 provides technical effects to optimize the audio visual quality of the communication in the case when there are multiple speakers (such as during a teleconference, for example).

The audio-visual optimizing system 730 provides a method to optimize both the audio and video quality capture with respect to the active speaker in a general communication scenario with multiple participants (such as a teleconference, or ad-hoc video telephone conversation when there are multiple participants present at one location, or video recording, for example).

According to one example of the invention, a method 900 is shown in FIG. 11. The disclosed method may comprise the following processing components or steps. Detect and track the position of all faces present in the video frames captured by the camera(s) (step 902). This may be implemented in a separate process running in a separate thread continuously during the video call. The process may, for example, monitor the position of all detected faces in the video stream and update these positions in a table accessible to the other processes. Detect the speaker by successively tuning the sensitivity of the microphone array towards each face direction for a short interval of time (step 904). If the audio level detected on such a direction exceeds a threshold, then the corresponding face is considered to be the active speaker's face. The successive scanning of the face directions continues when the audio level with respect to the current direction decreases under a threshold. Whenever an active speaker is detected by the microphone array, the camera parameters are optimized for the best detection of the active speaker's face (step 906). This may include operations such as automatic focus on the face, and automatic exposure in accordance to the face illumination, for example. However, in alternate embodiments, any camera parameters or operations may be adjusted and/or optimized. In this way, the system may cope with cases where the speakers' faces are not all in the same illumination conditions, and at the same distance from the camera(s). Additionally, some faces may be in very light or very dark areas of the scene and hence adjustment of the exposure parameters is needed to capture their image properly. On the other hand, some faces could be located closer, or further away, from the camera such that they cannot be all in focus at the same time. In this scenario, the system may provide for ensuring proper focus of the active speaker's face at each moment.

In addition, various embodiments of the invention may also address situations where the microphone array is not placed in a close spatial proximity of the camera. For example, with reference to FIGS. 6 and 10, the device 300 may comprise an audio-visual source tracking system 830 according to another example of the invention. Similar to the tracking system 330, the tracking system (or audio-visual optimizing system) 830 comprises the two cameras 332 and the three microphones 334. Similarly, the system 830 is configured to optimize the audio capture of the device by tuning the audio sensitivity towards the direction of the human face. As described above, the audio-visual optimizing system 830 allows for an estimation of the beam orientation relative to the mouth of the user. The system 830 provides for optimized audio visual quality of the communication in the case there are multiple speakers without restricting the microphone array position close to the camera(s).

When the microphone array is not close to the camera, the direction of the detected face with respect to the microphone array may no longer be identical with (or proximate) the direction of the face with respect to the camera optical centre. As shown in FIG. 7 (and discussed above), the case where the microphone array 334 is placed at the distance 380 from the cameras and the depth information is estimated with two cameras 332 by stereo vision is illustrated. In such a case, the direction of the face (or the mouth 38) of the user 40 with respect to the microphone array 334 may not be determined without knowledge of the depth information, or in other words without knowledge of the face position in the 3D space. The two cameras 332 of the audio-visual optimizing system 830 allow for an estimate of the depth (or depth information) based on the face relative location in the image captured by each camera (see FIG. 7). The larger the distance 380, the more important it is to determine the depth information to the face, in order to estimate the face orientation with respect to the microphone array. It should be noted that in alternate embodiments, more than two cameras 332 may be provided. Additionally, in other embodiments, an estimate of the depth with a single camera may be provided by analyzing the face size in the captured image, assuming that knowledge of typical face sizes are known.

Various embodiments of the invention may provide moveable camera lens/optics which are controlled and steered within a degree of flexibility by the microphone array that provides an improved flexibility for viewing angles. Additionally, embodiments of the invention may be utilized with voice/video calls, video recording or other associated use cases.

According to one embodiment of the invention, the system 730, 830 comprises two processes that may run in different threads. The two processes may communicate through a "Face Position Table (FPT)" 1000 (see FIG. 12). The FPT 1000 may be updated by one process, and read by the other process. Each row 1002 in the FPT corresponds to one detected face, and includes the face position in the 3D space. The first process may be a "Face Tracker (FT)" process 1100, and the second process may be an "Audio-visual Optimizer (AVO)" process 1200. FIG. 12 illustrates a schematic representation of one embodiment of the invention using the two processes ("Face Tracker" 1100 and "Audio-Visual Optimizer" 1200) that are running in different threads, and communicating through the table ("Face Position Table") 1000 that contains the position of each face detected in the scene. The FT process 1100 may be configured to continuously detect faces in a video stream and update their position in the FPT 1000. The AVO process 1200 may be configured to scan the face positions in the FPT 1000, detect the active speaker's face, and optimize the audio visual detection in the corresponding direction/position (from the FT process 1100).

Figure 13:
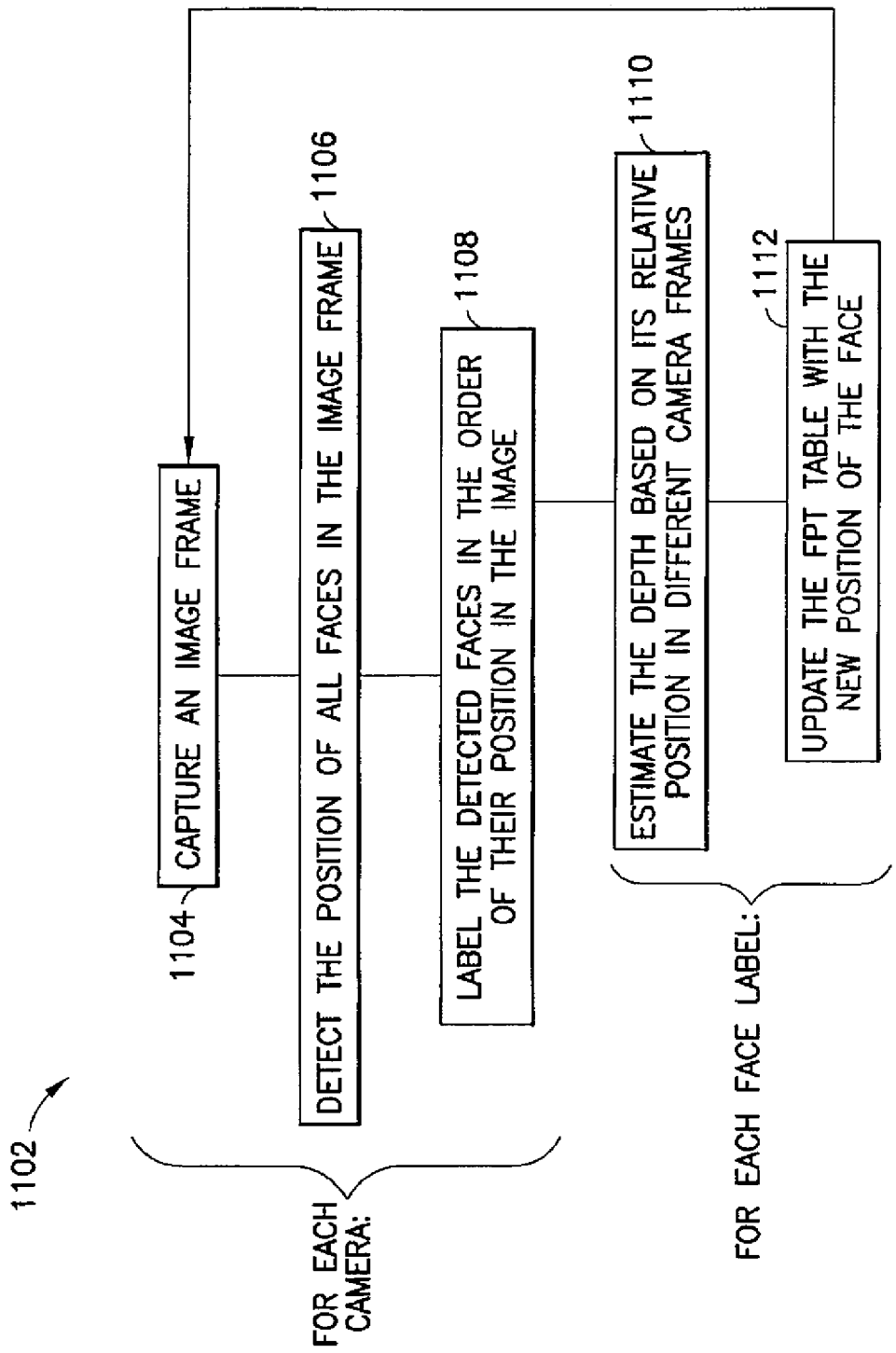
FIG. 13 is a block diagram of another exemplary algorithm used in the table shown in FIG. 12.

Referring now also to FIG. 13, an algorithm 1102 running in the FT process 1100 may be provided to perform the following steps for each camera. Capture an image frame (step 1104). Detect the position of all faces in the image frame based, for instance, on skin colour method (step 1106). Label the detected faces in the order of their position in the image from left to right and up to bottom (step 1108). In general, each real face will have the same label in all cameras. Additionally, each of the steps 1104-1108 may be provided for each of the cameras. Estimate the depth based on its relative position in different camera frames (step 1110). Update the FPT table 1000 with the new position of the face (step 1112). Go to step 1104. Each of the steps 1108, 1110 may be provided for each face label.

Figure 14:
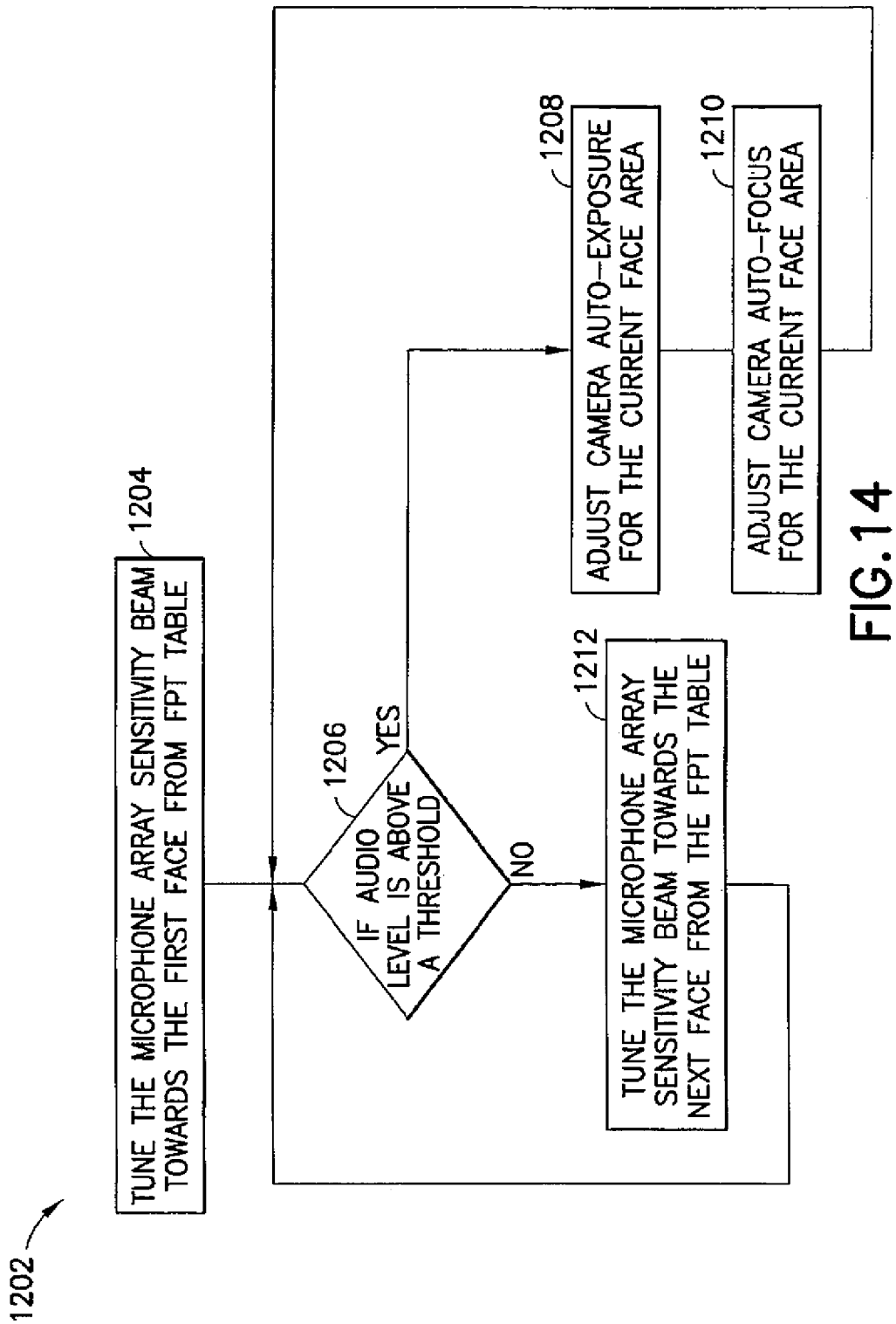
FIG. 14 is a block diagram of another exemplary algorithm used in the table shown in FIG. 12.

Referring now also to FIG. 14, an algorithm 1202 running in the AVO process 1200 (and assuming that there are K faces in the FPT table 1000) may be provided to perform the following steps. Tune the microphone array sensitivity beam towards the first face from FPT table 1000 (step 1204). If the audio level is above a threshold (step 1206), then adjust the camera auto-exposure for the current face area (step 1208), adjust the camera auto-focus for the current face area (step 1210), and return to step 1206. Else (if the audio level is not above the threshold), tune the microphone array, sensitivity beam towards the next face from FPT table (step 1212), and return to step 1206.

Figure 15:
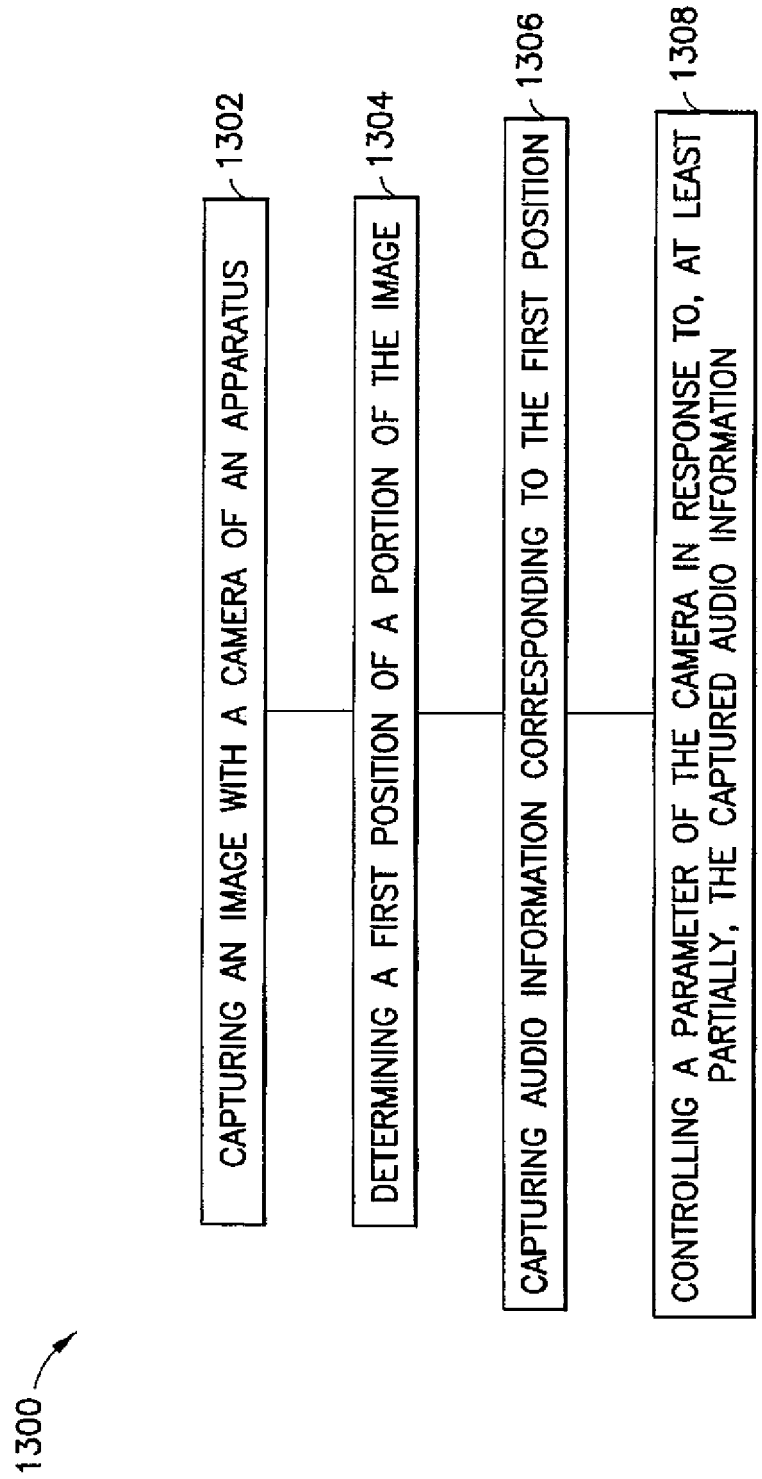
FIG. 15 is a block diagram of another exemplary method of the electronic device shown in FIG. 1 and FIG. 6.

FIG. 15 illustrates a method 1300. The method 1300 includes the following steps. Capturing an image with a camera of an apparatus (step 1302). Determining a first position of a portion of the image (step 1304). Capturing audio information corresponding to the first position (step 1306). Controlling a parameter of the camera in response to, at least partially, the captured audio information (step 1308).

According to various exemplary embodiments of the invention, a method for improved audio-visual communication is disclosed. Embodiments of the invention relate to optimizing both the audio and video (capturing) quality with respect to the active speaker in a general communication scenario when multiple participants are present (such as a video call, video recording, for example). Embodiments of the invention provide a method which identifies the active speaker within a multi speaker group and updates the visual parameters respectively.

Conventional device configurations having microphones (audio) and cameras (video) are generally considered independently and the scenarios are limited where two areas (audio and video) are linked to each other.) Considering the microphones and the cameras separately (independently), the technical effects that may be achieved in the audio and video quality respectively may be limited. Various embodiments of the invention provide for combining the information captured by the two types of sensors (microphones and camera) in order to improve one another's quality. For example, conventional configurations generally utilize improved cameras, lenses, and software support to improve imaging and video recording only. However, these improvements are generally utilized within narrow scopes or application categories. Embodiments of the invention therefore enhance the quality and create opportunities to adapt improved technologies into mobile phone devices.

In general audio visual communication scenarios (such as a video conference or other video telephone settings), one or more speakers at one location are communicated with one or more speakers at the other location through audio and video signals. In a simple conventional setup, a camera and a microphone at each location seems sufficient to accomplish this communication scenario. However, various technical issues may develop as the video quality generally depends on the camera settings which may not always be optimal for all the speakers (for example, the active speaker could be out of focus, or in a very dark/light area of the scene such that the camera cannot capture the image properly). Additionally, the background noise present at one location could disturb the audio signal coming from the active speaker's direction. Further, the camera and the microphones may not be placed in a close spatial proximity, such that the direction of the active speaker with respect to the microphone array may not be determined without knowledge of the face position in 3D space.

Accordingly, embodiments of the invention may alleviate the various technical issues described above resulting from conventional configurations. According to various embodiments of the invention, the audio and visual components may provide for video detection and tracking of human faces, controlling the directional sensitivity of the microphone array for directional audio capture (adaptive beamforming), and stereo imaging for capturing depth information (with respect to the camera) to the objects (in the image). As described above, the audio and visual components may include at least one video camera capturing the image of the users' faces, and an array of microphones configured to capture the users' voices (wherein the array of microphones may not need to be placed in the close proximity of the camera(s)). The microphone array may comprise at least 3 microphones (which may be omni microphones, for example) configured for microphone array beam steering in two dimensions (2D). The at least one video camera may include multiple cameras when the distance between microphone array and the cameras increases. However, any suitable audio/visual component configuration may be provided.

Embodiments of the invention provide for the improved quality of audio and video capture during hands-free voice and or video calls with one or multiple participants and/or in noisy environments. Embodiments of the invention provide for optimizing both audio and visual data respectively, and therefore enhancement of the quality of many use cases such as video calls, video recording situations, for example. Embodiments of the invention provide a method for an identification of a speaker within a multi-speaker group and updates visual parameters. The system detects/tracks position of faces by the camera/s, detects active speaker by the aid of microphone array and optimizes the visual information using the best detection.

Various embodiments of the invention can work in silent situations and can also work in multiple speaker groups. Embodiments of the invention may also include a moveable camera lens/optics which is controlled by the microphone array which may give improved flexibility for viewing angle(s).

Examples of the invention provide an improved configuration allowing for enhanced audio/video capture with different positions and illumination conditions for each participant by optimizing the video parameters (exposure, focus) with respect to the active speaker at each moment. Additionally, some embodiments of the invention may enable speaker tracking during speech pauses as it relies on continuous video tracking of all faces present in the visible scene. Further, embodiments of the invention may enhance the video recording performance as well as teleconference speech calls and quality in respect to both audio and visual data.

According to one example of the invention, an apparatus is disclosed. The apparatus includes the following elements. A housing. Electronic circuitry in the housing. An audio-visual source tracking system comprising a first video camera and an array of microphones, wherein the first video camera and the array of microphones are attached to the housing, wherein the audio-visual source tracking system is configured to receive video information from the first video camera, and wherein the audio-visual source tracking system is configured to capture audio information from the array of microphones at least partially in response to the video information.

According to another example of the invention, a program storage device readable by a machine is disclosed. The program storage device tangibly embodies a program of instructions executable by the machine for performing operations to sense an audio signal. The program storage device may perform the following operations. Analyzing a portion of an image. Calculating a direction corresponding to the portion of the image, wherein the direction is relative to an apparatus. Directing a microphone array from the apparatus based at least partially upon the calculated direction.

According to another example of the invention, an apparatus is disclosed. The apparatus includes a housing, electronic circuitry, and an audio-visual optimizing system. The electronic circuitry is in the housing. The audio-visual optimizing system includes a first video camera and an array of microphones. The first video camera and the array of microphones are attached to the housing. The first video camera includes at least one adjustable parameter. The audio-visual optimizing system is configured to receive audio information from the array of microphones. The audio-visual optimizing system is configured to adjust the at least one adjustable parameter of the first video camera in response to, at least partially, the audio information.

According to another example of the invention, a program storage device readable by a machine is disclosed. The program storage device tangibly embodies a program of instructions executable by the machine for performing operations to capture audio-visual information is disclosed. A microphone array of a device is tuned. Audio information received by the microphone array is evaluated. A camera parameter of the device is adjusted based on, at least partially, the evaluated audio information.

It should be understood that components of the invention can be operationally coupled or connected and that any number or combination of intervening elements can exist (including no intervening elements). The connections can be direct or indirect and additionally there can merely be a functional relationship between components.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
a housing;
electronic circuitry in the housing; and
an audio-visual system comprising a first camera and an array of microphones configured to detect a single active speaker via tuning a sensitivity of the microphone array towards a face of the single active speaker in video frames for an interval of time and determining that a detected audio level from a direction of the face of the single active speaker exceeds a threshold, wherein the first camera and the array of microphones are attached to the housing, wherein the first camera comprises at least one video capturing parameter, wherein the audio-visual system is configured to receive audio information from the array of microphones, and wherein the audio-visual system is configured to adjust at least one of the at least one video capturing parameter or at least one video capturing operation of the first camera in response to, at least partially: the audio information, wherein adjusting the at least one of the at least one video capturing parameter or the at least one video capturing operation is configured to optimize capture of an area in the video frames of the face of the single active speaker towards which the sensitivity of the microphone array is tuned.

2. An apparatus as in claim 1 wherein the at least one video capturing parameter comprises an auto-focus parameter.

3. An apparatus as in claim 1 wherein the at least one video capturing parameter comprises an auto-exposure parameter.

4. An apparatus as in claim 1 wherein the array of microphones is configured for microphone array beam steering.

5. An apparatus as in claim 1 wherein the array of microphones comprises at least three microphones, and wherein the audio-visual system is configured to stop adjusting the at least one adjusted video capturing parameter or the at least one adjusted video capturing operation of the first camera in response to, at least partially, determining that the detected audio level from the direction of the face of the single active speaker is below a second threshold.

6. An apparatus as in claim 1 wherein the audio-visual system further comprises a second camera, and wherein the first and the second cameras are configured to estimate depth information.

7. An apparatus as in claim 1 where the single active speaker is a person that is currently speaking.

8. An apparatus as in claim 1 where the audio-visual system is configured to adjust the at least one video capturing parameter based upon location of the area of the face in the video frames, where the audio-visual system is configured to adjust the at least one video capturing parameter for increasing detection of the face of the single active speaker in the video frames.

9. A method comprising:
capturing a video with a camera of an apparatus;
detecting and tracking a respective position of one or more faces in video frames outputted via the camera;
capturing audio information corresponding to the one or more respective positions with a microphone array of the apparatus;
detecting a single active speaker via tuning a sensitivity of the microphone array towards a face of the single active speaker for an interval of time and determining that a detected audio level from a direction of the face of the single active speaker exceeds a threshold, wherein, based on the determination that the detected audio level exceeds the threshold, the face in the direction is considered to be the single active speaker's face;
controlling a parameter of the camera for the single active speaker in response to, at least partially: the audio information, wherein controlling the parameter of the camera for the single active speaker is configured to optimize capture of an area in the video frames of the face of the single active speaker towards which the sensitivity of the microphone array is tuned;
wherein at least a portion of the camera and at least a portion of the microphone array are mounted inside a housing of the apparatus; and
wherein the apparatus is a multi-function portable electronic device.

10. A method as in claim 9 wherein the controlling of the parameter further comprises controlling an exposure and/or a focus parameter of the camera.

11. A method as in claim 9 wherein the capturing of the audio information further comprises adjusting a sensitivity of the microphone array.

12. A method as in claim 9 wherein the camera is configured to detect and track the respective position of the one or more faces in the video frames outputted via the camera.

13. A method as in claim 9 wherein the microphone array captures the audio information and wherein the microphone array is configured to detect the single active speaker.

14. A method as in claim 9 where the parameter of the camera is controlled for increasing detection of the face of the single active speaker in the video frames.

15. An apparatus comprising:
a housing;
electronic circuitry in the housing; and
an audio-visual optimizing system comprising a first camera configured to detect and track a respective position of one or more faces in video frames outputted via the first camera and an array of microphones configured to detect a single active speaker via tuning a sensitivity of the microphone array towards a face of the single active speaker for an interval of time and determining that a detected audio level from a direction of the face of the single active speaker exceeds a threshold, wherein, based on the determination that the detected audio level exceeds the threshold, the face in the direction is considered to be the single active speaker's face, wherein at least a portion of the first camera and at least a portion of the array of microphones are mounted inside the housing, wherein the first camera comprises at least one video capturing parameter, wherein the audio-visual system is configured to receive audio information from the array of microphones, wherein the audio-visual system is configured to adjust at least one of the at least one video capturing parameter or at least one video capturing operation of the first camera for the single active speaker in response to, at least partially: the audio information when the single active speaker is detected, wherein adjusting the at least one of the at least one video capturing parameter or the at least one video capturing operation is configured to optimize capture of an area in the video frames of the face of the single active speaker towards which the sensitivity of the microphone array is tuned,
and wherein the apparatus is a multi-function portable electronic device.

16. An apparatus as in claim 15 wherein the at least one video capturing parameter comprises an auto-focus parameter.

17. An apparatus as in claim 15 wherein the at least one video capturing parameter comprises an auto-exposure parameter.

18. An apparatus as in claim 15 wherein the array of microphones is configured for microphone array beam steering.

19. An apparatus as in claim 15 wherein the array of microphones comprises at least three microphones, wherein the at least three microphones comprise omni-directional microphones.

20. An apparatus as in claim 15 wherein the audio-visual system further comprises a second camera, wherein the first and the second cameras are spaced from the array of microphones, and wherein the first and the second cameras are configured to estimate depth information.

21. An apparatus as in claim 15 where the audio-visual system is configured to adjust the at least one video capturing parameter based upon location in the video frames of the area of the face of the detected single active speaker, where the audio-visual system is configured to adjust the at least one video capturing parameter to increase detection in the video frames of the face of the detected single active speaker, wherein the apparatus is configured to be oriented to capture at least a face of the single active speaker in the video frames.

* * * * *

UNITED STATES PATENT AND TRADEMARK OFFICE
CERTIFICATE OF CORRECTION

PATENT NO. : 10,904,658 B2
APPLICATION NO. : 15/606296
DATED : January 26, 2021
INVENTOR(S) : Marius Tico et al.

Page 1 of 1

It is certified that error appears in the above-identified patent and that said Letters Patent is hereby corrected as shown below:

In the Claims

In Claim 15
Column 16, Line 7, "optimizing" should be deleted.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*